United States Patent [19]

Linden

[11] Patent Number: 5,326,845

[45] Date of Patent: Jul. 5, 1994

[54] MOISTURE CURABLE SILICONE-URETHANE COPOLYMER SEALANTS

[75] Inventor: Gary L. Linden, Centerville, Ohio

[73] Assignee: DAP Products Inc., Tipp City, Ohio

[21] Appl. No.: 990,047

[22] Filed: Dec. 14, 1992

Related U.S. Application Data

[63] Continuation-in-part of Ser. No. 781,543, Oct. 22, 1991, abandoned.

[51] Int. Cl.$^5$ ............................................. C08G 77/26
[52] U.S. Cl. ........................................ 528/28; 528/33; 528/65; 427/387; 524/728; 524/789
[58] Field of Search ............................ 528/28, 33, 65; 427/387; 524/728, 789

[56] References Cited

U.S. PATENT DOCUMENTS

| | | | |
|---|---|---|---|
| Re. 32,889 | 3/1989 | Litke | 523/212 |
| Re. 33,141 | 1/1990 | Gomowicz et al. | 528/28 |
| 2,511,310 | 6/1950 | Upson | 260/46.5 |
| 2,849,473 | 8/1958 | Bailey et al. | 260/448 |
| 2,924,587 | 2/1960 | Shorr | 260/46.5 |
| 3,242,116 | 3/1966 | Becker et al. | 260/29.2 |
| 3,246,048 | 4/1966 | Haluska | 260/824 |
| 3,388,101 | 6/1968 | Wismer et al. | 260/77.5 |
| 3,562,352 | 2/1971 | Nyilas | 260/824 |
| 3,873,499 | 3/1975 | Michael et al. | 260/46.5 |
| 3,896,123 | 7/1975 | DeZuba et al. | 260/248 |
| 4,067,844 | 1/1978 | Barron et al. | 260/37 |
| 4,130,708 | 12/1978 | Friedlander et al. | 528/28 |
| 4,202,807 | 5/1980 | Moretto et al. | 260/29.1 |
| 4,214,066 | 7/1980 | Moretto et al. | 528/28 |
| 4,350,777 | 9/1982 | Henricho et al. | 52/110 |
| 4,539,345 | 9/1985 | Hansen | 523/219 |
| 4,647,643 | 3/1987 | Zdrahala et al. | 528/28 |
| 4,684,538 | 8/1987 | Klemarczyk | 427/54.1 |
| 4,769,409 | 9/1988 | Gay et al. | 524/188 |
| 4,777,037 | 10/1988 | Wagman et al. | 424/70 |
| 4,797,454 | 1/1989 | Ryang | 525/476 |
| 4,851,481 | 7/1989 | Kuriyama et al. | 525/454 |
| 4,857,623 | 8/1989 | Emmerling et al. | 528/28 |
| 4,916,199 | 4/1990 | Bandlish et al. | 528/28 |
| 4,942,034 | 7/1990 | Hill et al. | 424/401 |
| 4,996,266 | 2/1991 | Bronn et al. | 525/271 |
| 5,010,141 | 4/1991 | Mueller | 525/276 |

FOREIGN PATENT DOCUMENTS 57-195176  11/1982  Japan .

*Primary Examiner*—John C. Bleutge
*Assistant Examiner*—Margaret W. Glass
*Attorney, Agent, or Firm*—Biebel & French

[57] ABSTRACT

A moisture curable, one-part sealant composition comprising a silicone-urethane copolymer is provided. The copolymer is prepared via reaction of an alpha, omega hydroxy terminated siloxane having a molecular weight of 5,000 or less with a polyisocyanate. The copolymer has a free NCO content of greater than about 1 wt. % available for moisture cure upon usage.

13 Claims, No Drawings

MOISTURE CURABLE SILICONE-URETHANE COPOLYMER SEALANTS

CROSS-REFERENCE TO RELATED APPLICATIONS

This application is a continuation-in-part of application Ser. No. 781,543, filed Oct. 22, 1991, now abandoned.

FIELD OF THE INVENTION

The present invention pertains to moisture curable sealant compositions composed of a silicone-urethane copolymer, to methods for producing these copolymers, and to use of the copolymers in sealant or caulking compositions.

BACKGROUND OF THE INVENTION

Sealants and caulks are used for a variety of purposes, such as to fill in cracks, crevices or gaps in structural units and to fill spaces between neighboring panels or building units. The caulks and sealants function to protect the sealed surfaces against weather conditions and, accordingly, they must be capable of withstanding wide temperature, moisture, and sunlight exposure conditions in order to be successfully employed. These materials should be capable of absorbing shear, compression, and extension stresses exerted thereon caused by shifting movement of one structural unit relative to its neighboring unit. Ideally, the caulk or sealant should be capable of receiving paint and provide an acceptable adherence location therefor.

Various sealant and caulk types are presently in use. For example, polyurethane sealants provide versatile performance with excellent elongation and recovery and good tear strength and abrasion resistance. Most urethane sealant systems are based on reaction of polyhydroxy compounds with polyisocyanates to form polyurethane or urethane-urea elastomers.

In two-part urethane sealant compositions, an isocyanate source, typically a so-called urethane "prepolymer" is provided as one component to be mixed with a second component containing available hydroxyl functionality. Curing catalysts, such as methylene dianiline, fillers, and pigments may also be included within one or both of the formulation parts.

One-part moisture curing urethane sealant compositions are known in which, typically, an isocyanate prepolymer is mixed with fillers and pigments. The prepolymers cure via moisture absorption upon usage but curing catalysts, such as 1,2,4-trimethylpiperazine, can be used to speed the cure, but commonly require sacrifice in component storage life.

Silicone rubber sealants and caulks are also used and provide excellent heat resistance, low temperature flexibility and durability characteristics. Silicone sealants can be provided in either one-part or two-part formulations with the two-part mode usually comprising an hydroxyl-terminated polysiloxane and a cross-linking agent, such as ethyl orthosilicate packaged together as one of the parts. An organometallic activator or catalyst, such as dibutyl tin dilaurate is provided as the other part, with mixing of the two parts needed for curing.

In one-part silicone approaches, methyl substituted polysiloxanes having hydrolyzable end groups are commonly employed. When the component is subjected to atmospheric moisture upon usage, the hydrolyzable end groups are volatilized and the silicone effects cure through the formation of transient Si—OH bonds which condense to more stable Si—O—Si structure. The volatile hydrolyzable groups increase VOC emissions and, in some cases, can increase corrosion of the sealed structural units and create malodorous conditions.

As used herein, the terms "sealant" or "caulk" will be used interchangeably to denote the instant compounds that are used to fill and seal a joint. A sealant is bonded to the sides of a joint such that watertightness is retained even upon minor movement of the joint.

In contrast, a sealer is a liquid that is applied to a relatively porous surface to seal it and improve the adherence of the finish material or to waterproof the surface.

Accordingly, it is an object of the present invention to provide a storage stable one-part sealant composition in which the beneficial attributes of one-component urethane and silicone sealants are combined in a moisture curing sealant composition.

It is another object to provide such a composition that, unlike traditional one-part silicone formulations, does not contribute significant VOC emission upon moisture cure.

It is a more specific object to provide a silicone-urethane one-component sealant/caulk composition that exhibits enhanced toughness and anti-yellowing characteristics.

PRIOR ART

Japanese Patent Application 57-195176 discloses a liquid silicone waterproofing agent formed from an admixture of, or the reaction product of, a host of organopolysiloxanes with a variety of polyisocyanates. The disclosure is related to a waterproofing sealer in contradistinction to a sealant. The disclosed sealer is useful in waterproofing building materials, such as foamed concrete, mortar, slate, etc.

The '176 Japanese patent application indicates that for application to the desired surfaces, thinning with usual organic solvents is convenient. Exemplary solvents include benzene, toluene, xylene, etc., chlorinated hydrocarbon solvents such as carbon tetrachloride, trichloroethylene, etc. Mixtures of the organopolysiloxane and polyisocyanate components are stated to react to form a waterproof film upon drying of the mixture on a substrate while the disclosure also indicates that the components may be pre-reacted to some extent. Hydroxylated alkylpolydimethylsiloxanes are mentioned as being among the exemplary organopolysiloxane components.

Another waterproofing sealer is disclosed in U.S. Pat. No. 2,924,587 (Shorr). Here, the sealer is specifically used for waterproofing of textile fibers and fabrics. A liquid organo siloxane is provided in a solvent medium, such as toluene, along with a polyisocyanate. The textile fabric or fiber is dipped or coated with the solution. Faster curing and greater resistance to hydrocarbon solvents (such as those encountered via dry-cleaning) are obtained upon use of higher amounts of hydroxylated siloxane.

U.S. Pat. No. 4,684,538 discloses the reaction of a hydroxyalkyl-functional silicone with a polyisocyanate and a hydroxy(meth)acrylate to form a non-NCO containing, unsaturated polymer that is radiation cured for use as an adhesive. This disclosure indicates that an essential feature of the invention is the use of polysiloxane carbinols having a molecular weight of from 5,000–50,000. Otherwise, as stated in the disclosure, tensile strength, tear strength and shore A hardness characteristics of the resulting terpolymers would be unacceptable. Moreover, the terminal hydroxyalkyl groups must have greater than four carbon atoms so that the resulting reaction product will exhibit enhanced aging stability. Contrary to the present invention, the high molecular weight siloxanes would provide products that are too viscous and incompatible with polyisocyanates to be useful in the present invention.

Similarly, coating compositions comprising the reaction products of siloxy containing carbinols, a polyisocyanate and a polyfunctional compound containing hydroxy and acrylic functional groups are disclosed in U.S. Pat. No. 4,130,708 (Friedlander et al). The so-formed polymers are employed as radiation curable decorative or protective film coatings.

Alkoxysilane terminated moisture hardening polyurethanes and their use in adhesive and sealing compositions is disclosed in U.S. Pat. No. 4,857,623 (Emmerling). The siloxanes may comprise ethoxylated or propoxylated end groups.

One-part moisture cure polyurethane adhesives comprising a blend of isocyanate functional prepolymer, terpene-phenolic resin, and a silane compound are disclosed in U. S. Pat. No. 4,539,345.

Polyurethanes formed from organosilicon compounds containing active hydrogen functional groups and polyisocyanates are disclosed in U.S. Pat. No. 3,388,101 (Wismer et al). The products obtained are useful in products which may be subjected to high temperatures, such as laminates for oven or furnace doors, gaskets for internal combustion or steam engines and other similar uses.

Cyanate-functional oxazolinyl-polysiloxanes are disclosed in U.S. Pat. No. 4,797,454. These are prepared via reaction of a polycyanate compound and an epoxy-functional polysiloxane.

Elastomeric molding compositions are disclosed in Moretto et al. U.S. Pat. No. 4,202,807. Polyurethane is present as a solid phase in a liquid polyorganosiloxane. Preferably, a polyhydroxy compound is reacted with a polysiloxane followed by addition of a polyisocyanate.

SUMMARY OF THE INVENTION

In accordance with the invention, a moisture-curable one-part sealant/caulk composition is provided that includes a silicone-urethane copolymer having at least about 3–10 wt. % free NCO groups therein available for moisture curing when the copolymer is subjected to atmospheric moisture upon usage.

The copolymer is formed via anhydrous, room temperature reaction of a hydroxy-functional siloxane having a molecular weight of less than about 5,000 with an aliphatic or cycloaliphatic polyisocyanate in a suitable solvent medium, such as tetrahydrofuran, toluene, diglyme, etc. The ratio of polyisocyanate:siloxane reactant is controlled so that preferably about 3–10 wt. %, free NCO groups remain on the resulting silicone-urethane copolymer for moisture curing. The organic solvent can be conveniently vacuum stripped from the reaction medium and recycled for further use.

The copolymer so formed is a clear moisture curable oily mass. The copolymer provides excellent adherence to paint coated thereover.

DETAILED DESCRIPTION OF THE INVENTION

In accordance with the invention, a one-part, storage stable, moisture curable silicone-urethane copolymer sealant/caulk is provided that is the reaction product of an hydroxy functional siloxane and an aliphatic or cycloaliphatic polyisocyanate. The resulting isocyanato-functional silicone quasiprepolymer is a 100% solids, low viscosity, moisture-curable structure suitable for the production of tough, non-yellowing silicone caulks and sealants.

With regard to the hydroxy functional siloxane that may be used, these may be represented by the general formula

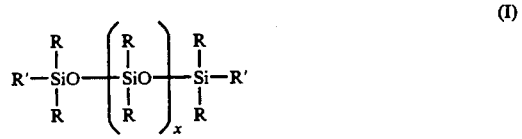

(I)

wherein each R is independently chosen from H, OH, $C_1$–$C_8$ alkyl, $C_1$–$C_8$ hydroxylated alkyl, aryl, halogenated $C_1$–$C_8$ alkyl, or halogenated aryl, with each R' being chosen from H, $C_1$–$C_8$ alkyl, $C_1$–$C_8$ hydroxylated alkyl, or OH with the proviso that at least two of the R or R' groups include hydroxy functionality. x is in the range of from about 1 to about 50. It is critical that, in order to provide desirable viscosity in the resulting silicone-urethane, the hydroxy functional siloxane must have a molecular weight of 5,000 a.m.u. or less.

Siloxanes (I) shown above are reported in U.S. Pat. No. 4,130,708 (Friedlander) incorporated by reference herein, and are also commercially available.

Preferred siloxanes are represented by the formula

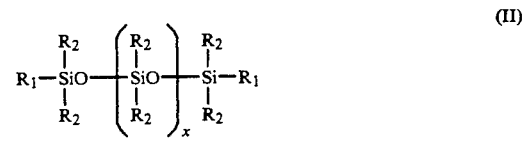

(II)

wherein each $R_2$ is independently chosen from $C_1$–$C_4$ alkyl with each $R_1$ selected from omega hydroxy substituted lower $C_1$–$C_4$ alkyl. Accordingly, $R_1$ may comprise —$CH_2OH$, —$CH_2CH_2OH$, —$CH_2CH_2CH_2OH$, or —$CH_2CH_2CH_2CH_2OH$. Again, the molecular weight of the siloxane must be below 5,000 a.m.u. dictating that the repeat unit x should be from about 1 to 50.

The alpha, omega hydroxy substituted polydimethylsiloxanes of the formula

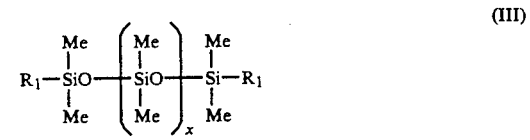

(III)

are especially preferred. One such polydimethylsiloxane, Dow Corning 7439-146, is presently preferred. In this product, $R_1$ is reputedly $CH_2CH_2CH_2OH$. Also, Goldschmidt Tegomer HSi, 2111 and 2311 may be mentioned as additional examples of suitable alpha, omega hydroxy substituted polydimethylsiloxane.

Although alpha, omega hydroxy terminated polysiloxanes are commercially available, for purposes of completeness, it is mentioned that they may be prepared, for example, by reaction of the corresponding hydride-terminated polysiloxanes and a lower alkenyl ($C_1-C_8$) ester of a simple carboxylic acid, such as acetic acid, followed by saponification of the ester moiety to the hydroxyl radical. Also, the hydride terminated polysiloxane, mixed with $D_4$ or similar cyclic silicones, can be brought into contact with commercially available ion exchange resins provided with the requisite strong acid groups thereon. Acid functional clays may also be suitable.

The aliphatic or cycloaliphatic polyisocyanates to be reacted with the siloxane may be chosen from a variety of commercially available compounds. These may be represented by the formula $$R_3(N=C=O)_n$$

wherein $R_3$ is an aliphatic radical having from about 2 to about 20 carbon atoms or a cycloaliphatic radical having from about 4 to about 20 carbon atoms, with n being an integer of greater than or equal to 2 (preferably 2 or 3). Exemplary polyisocyanates include 1,4-tetramethylene diisocyanate
1,6-hexamethylene diisocyanate
2,2,4-trimethyl-1,6-diisocyanate
1,10-decamethylene diisocyanate
1,4-cyclohexylene diisocyanate
1-isocyanato-3 isocyanato methyl-3,5,5-trimethylcyclohexane As used herein, it is to be understood that the term "polyisocyanate" and used herein and as shown in the structural formula supra., includes polyisocyanates containing carbodiimide groups such as are described in German Patent Specification No. 1,092,007, polyisocyanates containing allophanate groups such as are described, for example, in British Patent Specification No. 994,890, Belgian Patent Specification No. 761,626 and Netherlands Published Patent Application No. 7,102,524, polyisocyanates containing isocyanurate groups such as are described, for example, in German Patent Specification Nos. 1,022,789, 1,222,067 and 1,027,394 and also in German Offenlegungsschriften (German Published Specifications) 1,929,034 and 2,004,048, polyisocyanates containing urethane groups such as are described, for example, in Belgian Patent Specification No. 752,261 or in U.S. Pat. No. 3,394,164, polyisocyanates containing acylated urea groups according to German Patent Specification 1,230,778, polyisocyanates containing biuret groups such as are described, for example, in German Patent Specification No. 1,101,394, in British Patent Specification No. 889,050 and in French Patent Specification No. 7,017,514, polyisocyanates prepared by telomerization reactions such as are described, for example, in Belgian Patent Specification No. 723,640, polyisocyanates containing ester groups such as are mentioned, for example, in British Patent Specifications Nos. 965,474 and 1,072,956, in U.S. Pat. No. 3,567,763 and in German Patent Specification No. 1,231,688, and reaction products of the abovementioned isocyanates with acetals according to German Patent Specification No. 1,072,385.

In fact, the polyisocyanate preferred for use herein is classified as 1,6 hexamethylene diisocyanate based polyisocyanate that contains isocyanurate groups. In this regard, it is thought that a trimerization catalyst is added to the polyisocyanate resin to result in inclusion of isocyanurate groups therein. This reduces the vapor pressure of the product, reducing health risk factors. This product is sold under the trademark Desmodur N-3300 by Mobay. It is an isocyanurate of 1,6,-hexamethylene diisocyanate.

The hydroxy functional siloxane compound and polyisocyanate compound are mixed together at room temperature under anhydrous conditions, such as under a nitrogen blanket, and at equivalent ratios of hydroxy function:NCO function of 1:>1. The molar ratio of hydroxy-siloxane:polyisocyanate is chosen so that the resulting urethane-silicone copolymer has a percentage of free NCO groups (for subsequent moisture curing) of greater than 1 wt. %, preferably from about 3-10 wt. %. If the resulting polymer contains less than about 3 wt. % of free NCO groups, it will cure too slowly. Foaming problems may occur at a free NCO content level of greater than 10 wt. %. Viscosity of the resulting copolymer will be from around 5,000-100,000 cps.

The hydroxy siloxane-polyurethane reaction is carried out in an organic solvent medium, such as THF, xylene, toluene, etc. After reaction, the solvent may be vacuum stripped, leaving an oily urethane-silicone copolymer reaction product, and recycled.

The copolymer is used as a clear, one-part, moisture curing sealant or caulk over a variety of substrates, including wood, steel, aluminum, polyvinyl chloride. Also, to speed the rate of curing, conventional urethane cure catalysts, such as tin catalysts may be added to the one-part formulation.

A sufficient amount of the described composition is applied to a joint located between adjacent structural units with the composition then being allowed to moisture cure.

The invention will now be further described with reference to the following specific example which is to be regarded as illustrative and not as restricting the scope of the invention.

EXAMPLE 1

The hydroxypropyl functional silicone (Dow Chemical 7439-146) described above is dissolved in THF with an excess molar amount of polymeric hexamethylene diisocyanate (Mobay Desmodur N-3300) mixed therewith at room temperature. After mixing, the reaction mixture is allowed to stand in a closed container until the reaction is completed. The THF is vacuum stripped.

The resulting copolymer oil is allowed to cure under ambient conditions overnight and will provide a clear, tough, bubble-free elastomer which will appear non-yellow and flexible. The product will exhibit a Shore A hardness of about 80-85 and a Shore D hardness of about 30-35.

The product is storage stable and will emit only $CO_2$ upon curing.

EXAMPLE 2

Dow-Corning 7439-146 was used as the silicone component, it has a molecular weight of about 2,000, and also has the molecular formula

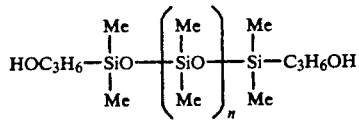

This silicone was mixed with the Mobay-N3300 in a molar ratio of 1:≈5 (silicone-HDI isocyanurate) in a THF solvent with addition of a catalytic amount of dibutyl tin dilaurate. The reactants were mixed at room temperature and were allowed to react overnight. The next day, the THF was vacuum stripped, leaving a viscous oil. This copolymer comprised 8.67 wt. % free NCO groups based on total copolymer weight. The oil was allowed to stand overnight, resulting in a clear elastomeric polymer. The polymer was used in the paint adhesion test reported herein.

COMPARATIVE EXAMPLE 1

A copolymer made substantially in accordance with experiment No. 24 of Japanese patent application 57-195176 was deemed to be the closest to the present invention and was prepared. Shin-Etsu KF 6001 an alpha, omega hydroxypropyl terminated polydimethylsiloxane, MW ≈ 1800 was used as the silicone reactant. The molecule purportedly has the structure

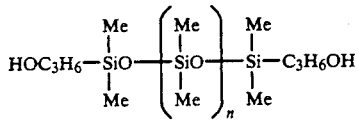

This silicone was mixed with Mobay Desmodur N-3300 (an isocyanurate containing derivative of HDI) in a molar ratio of 1:1 (silicone:isocyanurate of HDI) in a xylene solvent with addition of a catalytic amount of dibutyl tin laurate. The copolymer was fully reacted and therefore did not contain any free or available NCO groups. (The Mobay Desmodur N-3300 was substituted for the HDI mentioned in the Japanese application Example #24 due to the toxicity of HDI). The reactants were mixed at room temperature overnight. Then, the xylene was vacuum stripped from the reaction medium leaving a translucent white, waxy material. This material was allowed to evaporate overnight and was then used in the paint adhesion test reported infra.

EXAMPLE 3—PAINT ADHESION

In order to demonstrate the differences of my invention and the disclosure of the Japanese reference; comparative tests were undertaken to compare paint adhesion properties of a silicone-urethane copolymer of the present invention and the closest silicone-urethane copolymer produced in the examples of the Japanese reference. Paint adhesion is an important characteristic for sealants and caulk materials.

The copolymer of Example 2 and the comparative Example 1 copolymer were used as substrates with each having Sears® dark grey, exterior latex paint painted thereon. After this first painting, the substrates were allowed to sit for 2–4 hours, with another coat of paint then being applied. The substrates were allowed to dry overnight.

A piece of scotch tape was then manually pressed onto each of the substrates and was then suddenly pulled off. The paint on the Comparative Example #1 substrate peeled off while the paint firmly stuck to the Example 2 copolymer.

The copolymer of the present invention contained more free isocyanate groups than the comparative copolymer in light of the stoichiometric excess of NCO provided in the copolymer preparation. This is thought important in that the available NCO groups cure via $CO_2$ evolution leaving substituted urea cross linkages between the polymer chains. These substituted urea cross linkages apparently provide polar adhesion sites which enhance paint adhesion.

It is therefore apparent that the copolymers in accordance with the invention can be used without V.O.C. emitting solvent to provide a storage stable, clear, flexible moisture curable sealant to fill joints, cracks, crevices, gaps, or spaces in or between structural units. The copolymer moisture cures evolving only $CO_2$ during the curing process. Since the sealant is devoid of solvent, the entire sealant composition emits only $CO_2$. Moreover, the sealant shows improvement in paintability.

In order to impart increased sag resistance to the sealant, fumed silica may be added thereto in an amount of from 1–20 wt. %, preferably about 5% weight, based upon the weight of the silicone-urethane copolymer sealant. "Cab-O-Sil" fumed silica is presently preferred and is available from Cabot. Addition of silica does not impair the clarity of the sealant.

As another filler to improve sag resistance of the copolymer, "EA 21-22" polyamide additive from Rheox Inc. may be mentioned. Addition of this additive in the amount of from 1-20 wt. % will improve sag resistance but will provide a translucent product.

While this invention has been described with respect to particular embodiments thereof, it is apparent that numerous other forms and modifications will be obvious to those skilled in the art. The appended claims generally should be construed to cover all such obvious forms and modifications which are within the true spirit and scope of the present invention.

I claim:

1. A clear, paintable, one-part storage stable, moisture curable, sealant/caulk composition for filling joints between adjacent structural units, said composition being devoid of solvent and comprising a polyurethane-silicone copolymer, said copolymer comprising the reaction product of a hydroxy functional siloxane having a molecular weight of less than about 5,000 and an aliphatic or alicyclic polyisocyanate compound, said hydroxy functional siloxane being represented by the formula

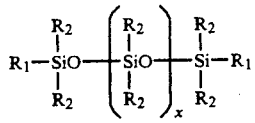

wherein each $R_1$ is —$CH_2CH_2CH_2OH$ each $R_2$ is methyl and wherein x is from 1 to about 50, said copolymer, prior to moisture curing, comprising about 8.67 wt. % of free NCO groups, said composition emitting only $CO_2$.

2. One-part sealant/caulk composition as recited in claim 1 wherein said polyisocyanate compound is represented by the formula $$R_3(N=C=O)_n$$

wherein $R_3$ is an aliphatic radical having from about 2 to about 20 carbon atoms or a cycloaliphatic radical having from about 4 to about 20 carbon atoms with n being an integer of greater than or equal to 2.

3. One-part sealant/caulk composition as recited in claim 2 wherein $R_3$ is an aliphatic radical having from about 2 to about 20 carbon atoms.

4. One-part sealant/caulk composition as recited in claim 3 wherein said polyisocyanate comprises 1,6-hexamethylenediisocyanate and 1,6-hexamethylenediisocyanate isocyanurate.

5. A clear, paintable, one-part storage stable sealant/caulk composition for filling joints between adjacent structural units, said composition being devoid of solvent and comprising a moisture curable polyurethane-silicone copolymer, said copolymer consisting essentially of the reaction product of an aliphatic or cycloaliphatic polyisocyanate and an alpha, omega, hydroxy terminated siloxane compound represented by the formula

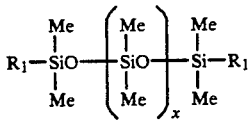

wherein each $R_1$ is $-CH_2CH_2CH_2OH$ and wherein x is from about 1–50, said siloxane compound having a molecular weight of less than 5,000; said copolymer, prior to moisture curing comprising about 8.67 wt. % of free NCO groups and being characterized by having a Shore A hardness of between about 80–85, said composition, upon curing, emitting only $CO_2$.

6. One-part sealant/caulk composition as recited in claim 5 wherein said polyisocyanate compound is represented by the formula $$R_3(N=C=O)_n$$

wherein $R_3$ is an aliphatic radical having from about 2 to about 20 carbon atoms or a cycloaliphatic radical having from about 4 to about 20 carbon atoms with n being an integer of greater than or equal to 2.

7. One-part sealant/caulk composition as recited in claim 6 wherein $R_3$ is an aliphatic radical having from about 2 to about 20 carbon atoms.

8. One-part sealant/caulk composition as recited in claim 7 wherein said polyisocyanate comprises 1,6-hexamethylenediisocyanate and 1,6-hexamethylenediisocyanate isocyanurate.

9. Combination comprising the one-part sealant/caulk composition recited in claim 5 and a filler material for imparting sag resistance to said sealant/caulk, said combination comprising from about 1–20 wt. % of said filler based upon the weight of said copolymer, said filler comprising a member selected from the group consisting of fumed silica and polyamide particles.

10. Combination as recited in claim 9 wherein said filler comprises fumed silica.

11. Combination as recited in claim 9 wherein said filler comprises polyamide particles.

12. Method of filling a joint located between adjacent structural units with a sealant/caulk composition comprising:
(a) applying to said joint a sufficient filling amount of the composition recited in claim 5; and
(b) allowing said composition to moisture cure.

13. A method of making a clear, paintable, one-part storage stable, moisture curable polyurethane-silicone copolymer for filling a joint located between adjacent structural units, and wherein said composition will emit only $CO_2$ upon curing, said method comprising the steps of:
a) providing a reaction medium including
1) an hydroxy functional siloxane having a molecular weight of less than 5,000 and having the formula

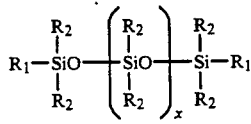

wherein each $R_1$ is $-CH_2CH_2CH_2OH$ each $R_2$ is methyl, wherein x is from 1 to about 50; and
2) a polyisocyanate compound comprising a member selected from the group consisting of aliphatic polyisocyanates and cycloaliphatic polyisocyanates; in an organic solvent, providing a stoichiometric excess of NCO groups to OH groups in said reaction medium such that the copolymer formed from said siloxane and polyisocyanate compound will have about 8.67 weight % free NCO groups therein;
(b) reacting said siloxane and said polyisocyanate compound at room temperature under anhydrous conditions; and
(c) removing said solvent from said reaction medium thereby isolating said copolymer.

* * * * *